US007530442B2

(12) United States Patent
Gerke et al.

(10) Patent No.: US 7,530,442 B2

(45) Date of Patent: May 12, 2009

(54) DEVICE FOR TURNING CONTINUOUSLY TRANSPORTED, FLAT LYING PRINTED PRODUCTS

(75) Inventors: Klaus Gerke, Bassum (DE); Andrea Haubrock, Hille (DE)

(73) Assignee: Kolbus GmbH & Co. KG, Rahden (DE)

(*) Notice: Subject to any disclaimer, the term of this patent is extended or adjusted under 35 U.S.C. 154(b) by 83 days.

(21) Appl. No.: 11/788,934

(22) Filed: Apr. 23, 2007

(65) Prior Publication Data

US 2007/0252322 A1 Nov. 1, 2007

(30) Foreign Application Priority Data

Apr. 26, 2006 (DE) ...................... 10 2006 019 233

(51) Int. Cl.
*B65G 37/00* (2006.01)
*B65G 47/248* (2006.01)

(52) U.S. Cl. ........................ 198/402; 198/406; 271/186

(58) Field of Classification Search ................. 198/402, 198/406, 407, 408, 607; 271/186
See application file for complete search history.

(56) References Cited

U.S. PATENT DOCUMENTS 2,936,917 A * 5/1960 Musgrave ................... 414/418
3,044,642 A * 7/1962 Bycer et al. ................. 414/418
4,368,973 A * 1/1983 Silverberg .................. 399/373
4,947,981 A * 8/1990 Dorner et al. ............... 198/360
6,279,900 B1 * 8/2001 Yamagishi .................. 271/240

FOREIGN PATENT DOCUMENTS

DE 4038239 A1 * 6/1992
JP 61145016 A * 7/1986
JP 61166405 A * 7/1986
JP 06048616 A * 2/1994

* cited by examiner

*Primary Examiner*—Mark A Deuble
(74) *Attorney, Agent, or Firm*—Alix, Yale & Ristas, LLP

(57) ABSTRACT

The disclosed device includes a feed conveyor (2), on which printed products (6) are transported within certain distances from one another, a turning section (1) with a path guide arranged tangentially downstream of the feed conveyor and a delivery conveyor (4) for the turned printed products (6) that extends underneath the feed conveyor (2) in the opposite transport direction. Lateral guides (12) are assigned to the path guides (13) and can be adjusted to the format width of the printed products (6). The delivery conveyor (4) is a suction conveyor belt with at least one suction segment (19) in the region of the delivery point of the turning section (1) in order to decelerate the printed products (6) to the transport speed of the delivery conveyor (4).

14 Claims, 2 Drawing Sheets

DEVICE FOR TURNING CONTINUOUSLY TRANSPORTED, FLAT LYING PRINTED PRODUCTS

BACKGROUND

The present invention pertains to a device for turning continuously transported, flat lying printed products.

In the manufacture of books, brochures, book blocks or similar bound printed products, the required processing machines are coupled to one another by means of conveying devices such that assembly lines are formed, wherein the printed products are usually transported in a flat lying fashion. Reorientations during the transport are carried out in order to realize a different product position for ensuing processing steps. It is known to transfer the printed products from a feed conveyor that transports the printed products in a first direction to a delivery conveyor that is arranged underneath the feed conveyor and extends in the opposite transport direction such that the printed products are additionally transported after they are turned in the transport plane by 180° referred to the transport direction.

In one known device for turning printed products that are flexible to a certain degree, the printed products are transported with a minimum speed from the feed conveyor into a vertically arranged and downwardly extending path guide slide that is essentially arranged tangentially downstream of the feed conveyor and realized in a semicircular or C-shaped fashion, wherein the printed products adjoin the inwardly curved guideway under the influence of the centrifugal force. In this case, the printed products are turned by 180° about an axis that extends parallel to the leading edge such that they are turned from their upper side to their lower side and the leading edge remains unchanged. At the outlet of the slide, the printed products are transferred to a delivery conveyor that is essentially arranged tangentially downstream of the slide and extends in the opposite direction of the feed conveyor situated above the delivery conveyor.

This turning device has a simple constructive design. With the exception of the feed conveyor and the delivery conveyor, this turning device features no drives and also requires no controlled elements. However, it is disadvantageous that the printed products need to have a minimum speed at the inlet such that they do not fall off the slideway due to their gravitational force. However, this results in a very high speed at the outlet such that the printed products continue to slide on the slower delivery conveyor and the distances between successively transported printed products are not defined. Particularly asymmetric weight and/or stiffness distributions in the printed products as they occur, for example, with printed products that are fed longitudinally referred to the bound spine result in greater turning in the respective transport plane while the printed products slide on the inwardly curved guideway. This may result in product alignments at the outlet that are turned by 45° or more and can only be corrected with costly auxiliary devices.

SUMMARY

The present invention satisfies the objective of providing a device for turning continuously transported, flat lying printed products, having a simple constructive design that reliably and flawlessly turns printed products with asymmetric weight and/or stiffness distribution.

According to the present disclosure, this objective is attained with lateral guides operatively associated with the path guide and adjustable to the respective format width of the printed products and with the delivery conveyor provided as a suction conveyor belt with at least one suction segment arranged in the region of the transfer point of the turning section for decelerating the printed products to the transport speed of the delivery conveyor.

Undesirable turning and/or shifting is precluded due to the lateral guides that can be adjusted to the format width of the printed products, as well as a delivery conveyor in the form of a suction belt conveyor. Printed products with an asymmetric weight and/or stiffness distribution, in particular, can no longer twist during the turning process in the turning section or after they are deposited on the delivery conveyor. The lateral guides keep the printed products on track in the turning section and the printed products are taken hold off by the suction belt conveyor and decelerated to the transport speed of the delivery conveyor at the outlet of the turning section. The constructively simple turning principle was essentially preserved and is now suitable for a broader spectrum of printed products.

It is advantageous that the negative pressure is adjustable within the suction segment of the suction belt conveyor in order to compensate the respective kinetic energy of the arriving printed products along a defined transfer segment, for example, over the length of the suction segment. For example, the adjustment can be carried out in dependence on the weight of the printed products in order to define, in particular, the kinetic energy of the printed product.

According to an advantageous embodiment, the turning device features an accelerating conveyor that receives the printed products from the feed conveyor and transports the printed products to the guideway of the turning section, wherein said accelerating conveyor has an adjustable speed and serves for decelerating or slowing down the arriving printed products. The respectively required minimum speed is realized directly upstream of the inlet into the turning section such that a slower speed that is adapted to the product height can be adjusted in the upstream transport section.

In another embodiment, a measuring system is provided in order to sense the transit time of the printed products through the turning section. Light barriers at the inlet and the outlet of the turning section sense the leading or trailing edge of the respective printed product and an evaluation unit determines a corresponding transit time that, according to one additional development, can be used for controlling the speed of the accelerating conveyor arranged at the inlet, namely such that the printed products are deposited on the delivery conveyor within defined distances from one another and/or synchronous with the cycle of an additional processing device. This makes it possible to eliminate synchronizing devices downstream of the turning device.

The turning section is advantageously realized with inner supporting means that spare the lateral edge regions of the printed products. Printed products that are on the verge of falling off due to an excessively slow infeed speed are thusly held in the turning track without causing the supporting means to act upon the stiff bound spine of printed products transported along their spines. The supporting means are advantageously realized in the form of freely rotatable rollers that create a convex support track.

In yet another embodiment, the lateral guides are realized in the form of two vertically arranged guide plates and semicircularly curved guide plates that form the guiding means of the turning section are respectively fixed in a perpendicular fashion on the vertical support plates. In order to realize a constructively simple adjustment of the lateral guides to the respective format width, the curved guide plates have a certain guiding width for guiding the printed products on their edge regions.

BRIEF DESCRIPTION OF THE DRAWING

The characteristics of one preferred embodiment of the present invention are described in greater detail below with reference to the enclosed drawing, in which.

DETAILED DESCRIPTION

Figure 1:
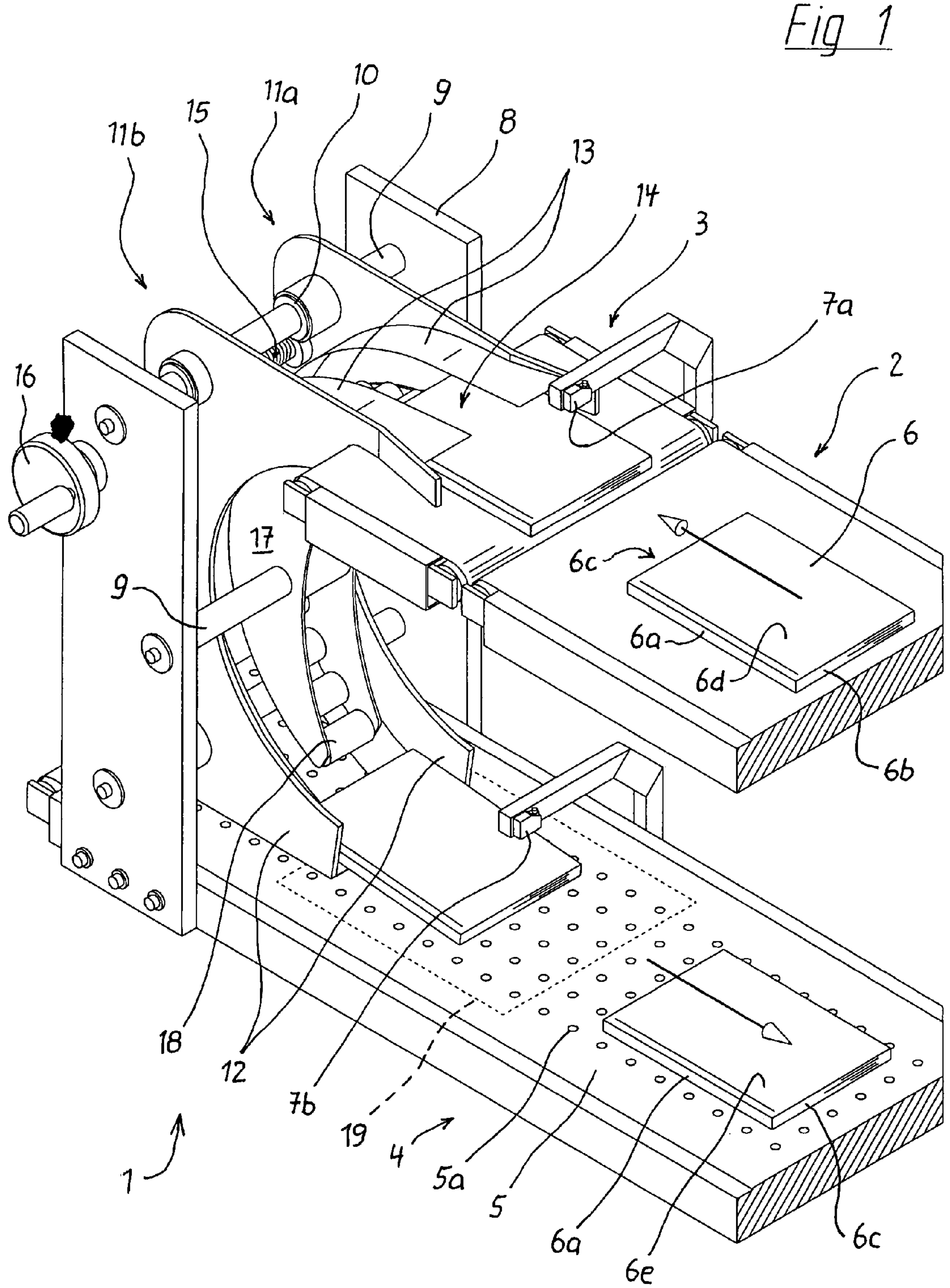
FIG. 1 shows a perspective representation of a transport system with a turning slide realized in accordance with the invention.
Figure 2:
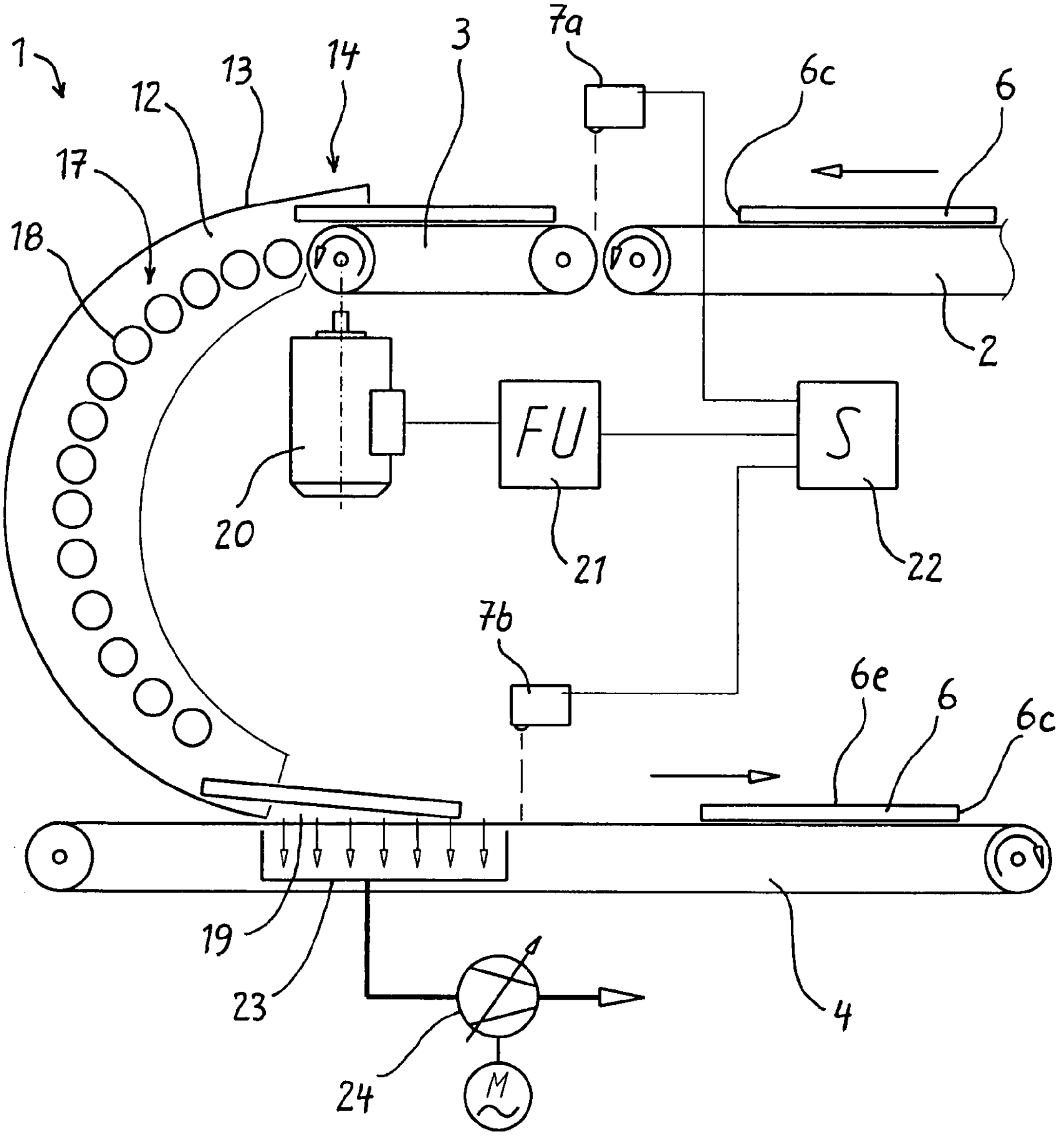
FIG. 2 shows a schematic side view of the transport system with symbolically illustrated control means.

The figures show a transport system comprising a feed conveyor 1 for continuously transporting the spaced-apart, flat lying bound brochures 6, a downstream accelerating conveyor 3 that is driven by a motor 20 with frequency control 21, a delivery conveyor 4 that is situated underneath the feed conveyor 2 and extends in the opposite transport direction, and a turning slide 1 that is arranged tangentially downstream of the accelerating conveyor 3 in the form of a semicircular turning section and downwardly transfers the brochures 6 to the delivery conveyor 4 along a curved track.

The brochures 6 that are transported into the turning slide 1 with a minimum speed by the accelerating conveyor 3 adjoin the inwardly curved guideway during the sliding process due to the centrifugal force and are turned by 180° about an axis that extends parallel to the leading edge such that the brochures are turned from their upper side to their lower side and the leading edge remains unchanged.

According to FIG. 1, the brochures 6 are fed longitudinally referred to the bound spine 6*a*. The head 6*b* lies in the rear and the leading edge is defined as the foot 6*c* such that the rear side 6*d* is situated on top. After the turning process, the foot 6*c* continues to lead while the rear side 6*d* lies on the delivery conveyor 4 and the front side 6*e* is now situated on top. The turning slide 1 is also suitable, in principle, for different product positions, for example, brochures 6 that are fed transverse referred to the spine 6*a*.

The turning slide 1 is essentially composed of a right and a left outer slideway 11*a, b* and an assigned inner support 17 that quasi forms a guide channel and consists of a plurality of freely rotatable support rollers 18 arranged in a convex shape. The respective slideways 11*a* and 11*b* feature a lateral guide plate 12 with a semicircularly curved sliding plate 13 perpendicularly fixed thereon. An opening inlet region 14 is realized on the slideways 11*a, b* at the inlet of the turning slide 1.

Both slideways 11*a, b* are guided by means of sliding bearings 10 on axles 9 that are accommodated in a frame 8 fixed on the delivery conveyor 4. The positions of the slideways 11*a, b* are defined by an adjusting spindle 15 that can be actuated with the aid of a hand wheel 16 in order to adjust the width on center.

In order to flawlessly and reliably receive the brochures 6 sliding out of the turning slide 1, the delivery conveyor 4 is realized in the form of a suction conveyor belt. The conveyor belt 5 is provided with a multitude of openings 5*a* for this purpose. A suction segment 19 that lies in the region of the transfer point from the turning slide to conveyor 4 is defined by the arrangement of the corresponding suction box 23 in the support frame of the delivery conveyor 4.

The suction box 23 is connected to an adjustable suction air source 24 such that the negative pressure in the suction segment 19 can be adjusted in order to compensate the respective kinetic energy of the received brochures 6 along the transfer section defined by the suction segment 19. The adjustment of the negative pressure may take place, for example, in dependence on the weight of the brochures 6 such that the kinetic energy of the brochures 6 is essentially defined after the passage through the turning slide 1.

A speed control is provided for the accelerating conveyor 3 in order to turn the brochures 6 within the desired transit time. The foot 6*c* is respectively detected as the leading edge of the brochures 6 by light barriers 7*a, b* that are arranged at the inlet of the accelerating conveyor 3 and the transfer point to the delivery conveyor 4. The signals are fed to a control unit 22 and assigned to the respective transport speed at the inlet of the turning slide 1 in order to determine the transit time of the brochures 6 through the turning slide 1.

The control unit 22 is programmed in a self-learning fashion in order to define an adjusting signal for the frequency converter 21 and therefore a transport speed on the accelerating conveyor 3 and to thusly observe the predefined transit time during the turning process. The control unit 22 has information on the desired transfer time, for example, due to the transmission of guide values from an additional processing device arranged downstream thereof. Once the brochure 6 arrives at the first light barrier 7*a*, the time difference between the desired transfer time on the delivery conveyor 4 and the arrival time at the inlet is formed. The transport speed of the accelerating conveyor 3 is now defined in dependence on the previously evaluated transit times such that a transit time is adjusted that corresponds to the time difference.

The brochures 6 can be deposited on the delivery conveyor 4 within defined distances from one another and/or synchronous with the cycle of an additional processing machine. Synchronizing devices are no longer required downstream of the turning slide 1.

The invention claimed is:

1. A device for turning continuously transported, flat lying bound printed products comprising:

- a driven feed conveyor transporting the printed products within certain distances from one another in a transport direction;
- a turning section arranged substantially tangentially downstream of the feed conveyor having an inlet and extending semicircularly downward to an outlet, said turning section including a path guide that provides an inwardly curved sliding path for the printed products received with sufficient speed to slide freely downwardly and under the force of gravity along said sliding path in a transit time through the turning section to a transfer point at the outlet;
- a delivery conveyor for the turned printed products that extends underneath the feed conveyor in the opposite transport direction and is arranged substantially tangentially downstream of the turning section to receive a guided printed product at the transfer point;
- lateral guides operatively associated with the path guide and adjustable to the respective format width of the printed products;
- wherein said delivery conveyor is a suction conveyor belt having a transport speed in said opposite transport direction with at lease one suction segment arranged at the transfer point for decelerating the printed products to the transport speed of the delivery conveyor.

2. The device according to claim 1, wherein the suction pressure in the suction segment is adjustable.

3. The device according to claim 1, including a rotatively driven transporter that receives the printed products from the feed conveyor and transports and releases the printed products at a transport speed into the inlet of the turning section.

4. The device according to claim 3, wherein the feed conveyor transports the printed product at a relatively fast speed to the transporter and the transporter decelerates the printed product to an adjustable, relatively slower transport speed, at which the printed product is released into the inlet of the turning section.

5. The device according to claim 3, including a measuring system with a central unit that features a respective light barrier associated with the inlet and with the outlet of the turning section in order to determine the transit time of the printed products through the turning section.

6. The device according to claim 5, including a speed controller for the transporter, responsive to said transit time such that the printed products are transported onto the delivery conveyor within defined distances from one another and/or synchronous with the cycle of a downstream additional processing device.

7. The device according to claim 1, including a measuring system with a central unit that features a respective light barrier at the inlet and at the outlet of the turning section in order to determine the transit time of the printed products through the turning section.

8. The device according to claim 7, including a speed controller for the feed conveyor, responsive to the transit time of the printed product through the turning section such that the printed products are transported onto the delivery conveyor within defined distances from one another and/or synchronous with the cycle of a downstream additional processing device.

9. The device according to claim 1, wherein the turning section features inner supporting means that together with the path guide form a guide channel for the printed products.

10. The device according to claim 9, wherein the inner supporting means comprises a sequence of freely rotating rollers that create a convex inner support track.

11. The device according to claim 1, wherein the lateral guides comprise two vertically arranged lateral guide plates with respective perpendicularly oriented semicircularly curved guide plates that serve to guide printed products in the turning section.

12. The device according to claim 11, wherein the curved guide plates are spaced apart with at least one guiding width for guiding the printed products adjacent the edges of the products.

13. A device for turning continuously transported, flat lying bound printed products comprising:

a feed conveyor, on which the printed products are transported within certain distances from one another;

a turning section arranged substantially tangentially downstream of the feed conveyor and extending semicircularly downward, said turning section including a path guide that provides an inwardly curved sliding path for the printed products to follow during a transit time through the turning section;

a rotatively driven transporter that receives the printed products from the feed conveyor and transports the printed products at a transport speed to the turning section;

a delivery conveyor for the turned printed products that extends underneath the feed conveyor in the opposite transport direction and is arranged substantially tangentially downstream of the turning section to receive a guided printed product at a transfer point from the turning section;

lateral guides operatively associated with the path guide and adjustable to the respective format width of the printed products;

wherein said delivery conveyor is a suction conveyor belt with at least one suction segment arranged at the transfer point of the turning section for decelerating the printed products to the transport speed of the delivery conveyor; and a speed controller for the transporter, responsive to the transit time of the printed product through the turning section such that the printed products are transported onto the delivery conveyor within defined distances from one another and/or synchronous with the cycle of a downstream additional processing device.

14. A device for turning continuously transported, flat lying bound printed products comprising:

a feed conveyor, on which the printed products are transported within certain distances from one another;

a turning section arranged substantially tangentially downstream of the feed conveyor and extending semicircularly downward, said turning section including a path guide that provides an inwardly curved sliding path for the printed products;

a rotatively driven transporter that receives the printed products from the feed conveyor and transports the printed products at an adjustable transport speed to the turning section;

a delivery conveyor for the turned printed products that extends underneath the feed conveyor in the opposite transport direction and is arranged substantially tangentially downstream of the turning section to receive a guided printed product at a transfer point from the turning section;

lateral guides operatively associated with the path guide and adjustable to the respective format width of the printed products;

wherein said delivery conveyor is a suction conveyor belt with at least one suction segment arranged at the transfer point of the turning section for decelerating the printed products to the transport speed of the delivery conveyor; and a measuring system with a central unit that features a respective light barrier at the inlet and at the outlet of the turning section in order to determine the transit time of the printed products through the turning section.

* * * * *